United States Patent
Lin et al.

(10) Patent No.: US 6,754,071 B2
(45) Date of Patent: Jun. 22, 2004

(54) COMPUTER ENCLOSURE INCORPORATING DRIVE BRACKETS

(75) Inventors: WanCheng Lin, Tu-Chen (TW); Li Yun Gan, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 153 days.

(21) Appl. No.: 10/174,428

(22) Filed: Jun. 17, 2002

(65) Prior Publication Data

US 2003/0202321 A1 Oct. 30, 2003

(30) Foreign Application Priority Data

Apr. 30, 2002 (TW) ...................................... 91205979 U

(51) Int. Cl.⁷ ............................................... G06F 1/16
(52) U.S. Cl. .................... 361/685; 361/683; 312/223.2; 312/257.1; 248/694
(58) Field of Search ................................ 361/683–686, 361/724–727; 312/223.1, 223.2, 257.1, 265.5, 265; 248/694, 27.1, 229.1, 695

(56) References Cited

U.S. PATENT DOCUMENTS

| | | | | | |
|---|---|---|---|---|---|
| 5,067,041 A | * | 11/1991 | Cooke et al. | ............... | 361/685 |
| 5,306,079 A | * | 4/1994 | Liu | ......................... | 312/223.2 |
| 5,566,383 A | * | 10/1996 | Gildea et al. | ............... | 361/685 |
| 5,600,538 A | * | 2/1997 | Xanthopoulos | ............. | 361/683 |
| 5,995,364 A | * | 11/1999 | McAnally et al. | .......... | 361/685 |
| 6,266,239 B1 | * | 7/2001 | Cook et al. | ................. | 361/683 |
| 6,507,487 B1 | * | 1/2003 | Barina et al. | ............... | 361/685 |
| 6,529,373 B1 | * | 3/2003 | Liao et al. | .................. | 361/685 |
| 6,530,551 B2 | * | 3/2003 | Gan | ............................ | 248/694 |

* cited by examiner

*Primary Examiner*—Lisa Lea-Edmonds
(74) *Attorney, Agent, or Firm*—Wei Te Chung

(57) ABSTRACT

A computer enclosure includes a cage (200) and a drive bracket (100) for pivotably attaching storage devices (300) to the cage. The cage includes a front panel (240), two side panels (260), and two supporting walls (280). Each supporting wall has a rim (281). A guideway (282) is defined in the supporting wall. A guiding entrance (284) defined in the rim separates the rim into front and rear parts. The front part includes a protrusion (288). The drive bracket includes spaces for accommodating the storage devices therein, and two side plates (140) each having a railway (142). Each railway defines a cutout (143). The railways are slidable along the guideways between a first position in which the protrusions are inserted into the cutouts and the storage devices are partly received in the cage and a second position in which the storage devices are fully received in the cage.

19 Claims, 4 Drawing Sheets

COMPUTER ENCLOSURE INCORPORATING DRIVE BRACKETS

BACKGROUND OF THE INVENTION

1. Field of the Invention

The present invention relates to computer enclosures, and particularly to computer enclosures incorporating drive brackets.

2. Related Art

Various data storage devices are installed in computers for communication and handling of data. Such devices include, for example, hard disk drives, floppy disk drives, and CD-ROM drives.

In a conventional computer, a data storage device is attached in a drive bracket. The combined data storage device and drive bracket is then attached to a computer enclosure. The drive bracket is secured to the computer enclosure with screws. However, many components are compactly arranged in a limited space inside the computer enclosure. Attachment with screws is therefore unduly inconvenient and complicated.

Therefore, pivotable drive brackets have been developed. Taiwan Patent Application No. 88221950 discloses a pivotable drive bracket attaching a data storage device to a computer enclosure. The drive bracket has circular pivots on opposite sides thereof. The computer enclosure provides circular holes in a front plate thereof. The pivots can rotate in the holes to pivotably attach the data storage device to the computer enclosure. However, circular pivots in circular holes can rotate as much as 360 degrees. Stopping components are thus required to limit rotation of the drive bracket, and thereby provide correct positioning of the data storage device within the enclosure. These extra components complicate the structure of the computer enclosure and increase to costs.

SUMMARY OF THE INVENTION

Accordingly, an object of the present invention is to provide a computer enclosure which has a drive bracket readily attaching a data storage device to the computer enclosure in a simple manner.

To achieve the above-mentioned object, a computer enclosure in accordance with the present invention comprises a cage and a drive bracket for pivotably attaching a pair of data storage devices to the cage. The cage comprises a front panel, a pair of side panels, and a pair of supporting walls parallel to the side panels. The front panel defines a pair of windows for providing external access to the data storage devices. Each supporting wall has a horizontal rim extending from a top edge thereof. A guideway is defined in the supporting wall. A guiding entrance is defined through a middle portion of the horizontal rim, thus separate it into a front part and a rear part. The guiding entrance is in communication with the guideway. The front part comprises a slanted protrusion. The drive bracket comprises a pair of receiving spaces for accommodating the data storage devices therein, and a pair of side plates each having a railway. Each railway defines a cutout. The railways are slidable along the guideways between a first position in which the protrusions are inserted into the cutouts and the data storage devices are partly received in the cage and a second position in which the data storage devices are fully received in the cage.

Other objects, advantages and novel features of the present invention will be drawn from the following detailed description of a preferred embodiment of the present invention with attached drawings, in which:

DESCRIPTION OF THE PREFERRED EMBODIMENTS

Figure 1:
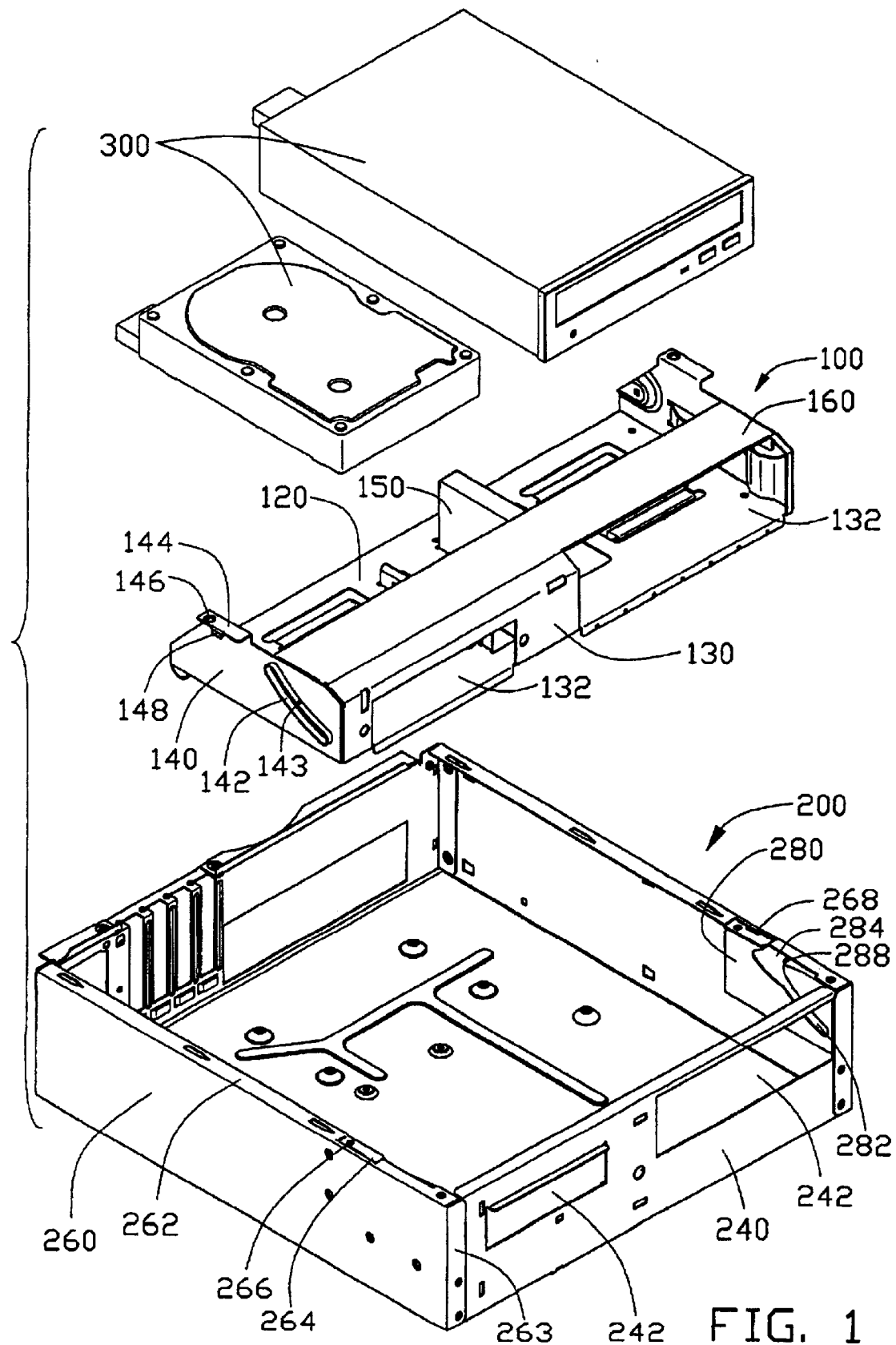
FIG. 1 is an exploded view of a computer enclosure in accordance with the present invention, together with a pair of data storage devices.

Referring to FIG. 1, a computer enclosure in accordance with a preferred embodiment of the present invention comprises a drive bracket 100 and a cage 200

The drive bracket 100 comprises a bottom plate 120, a front plate 130, a pair of side plates 140, a partition plate 150 between the side plates 140, and a top plate 160. The bottom plate 120, front plate 130, side plates 140, partition plate 150 and top plate 160 cooperatively form a pair of receiving spaces therebetween for respectively receiving a pair of data storage devices 300. The front plate 130 defines a pair of openings 132, for providing external access to the data storage devices 300. Each side plate 140 comprises an arcuate railway 142 projecting outwardly therefrom. A cutout 143 is defined in an upper middle portion of the railway 142. Each side plate 140 further comprises a flange 144 extending perpendicularly outwardly from a rear portion of a top edge thereof. A first through aperture 146 is defined in each flange 144. An insertion tab 148 depends from an outmost edge of the flange 144, and is disposed parallel to the corresponding side plate 140.

Figure 3:
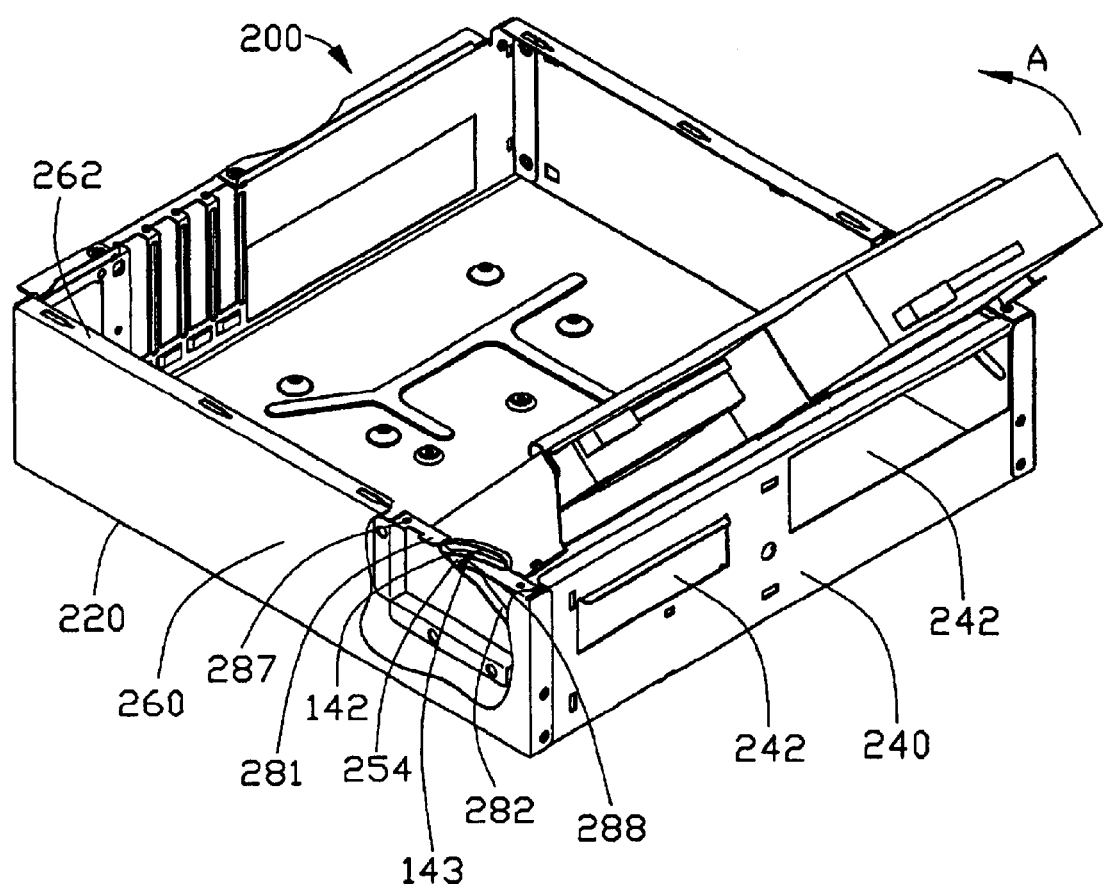
FIG. 3 is a partly assembled and partly cut-away view of FIG. 1, showing the drive bracket in a first position.

Referring also to FIG. 3, the cage 200 comprises a front panel 240 and a pair of side panels 260. The front panel 240 defines a pair of windows 242, corresponding to the openings 132 of the drive bracket 100. Each side panel 260 comprises a horizontal bent strip 262 extending inwardly from a top edge of thereof. Each side panel 260 further comprises a vertical bent strip 263 extending inwardly from a front edge thereof. The vertical bent strips 263 are riveted to opposite sides of the front panel 240. A recessed portion 264 is formed in a forward portion of each bent strip 262. A second through aperture 266 is defined in each recessed portion 264. A slit 268 is defined in each recessed portion 264 adjacent and parallel to the corresponding side panel 260. A pair of supporting walls 280 extends rearwardly from opposite sides of the front panel 240 respectively. Each supporting wall 280 is parallel to and spaced inwardly from the corresponding proximate side panel 260. A horizontal rim 281 extends from a top edge of each supporting wall 280 toward the proximate side panel 260. Each horizontal rim 281 is riveted to the corresponding bent strip 262. In an alternative embodiment of the present invention, each supporting wall 280 can be a separate plate that is secured to proximate side panel 260 by conventional means. Further or alternatively, each supporting wall 280 can depend from the corresponding bent strip 262. Each supporting wall 280 defines a generally arcuate guideway 282. The guideway 282 spans from the horizontal rim 281 to a bottom front portion of the supporting wall 280. A guiding entrance 284 is defined in a middle portion of the horizontal rim 281, and separates the horizontal rim 281 into a front part and a rear part. The guiding entrance 284 is in communication with the guideway 282. A third aperture 287 is defined in the rear part of the horizontal rim 281, in alignment with the second through aperture 266 of the proximate recessed portion 264. The front part of the horizontal rim 281 is convexly arcuate, such that a rearmost end of the front part is lower than a frontmost end of the front part. A slanted protrusion 288 is upwardly formed from the rearmost end of the front part, corresponding to one of the cutouts 143 of the drive bracket 100.

Figure 2:
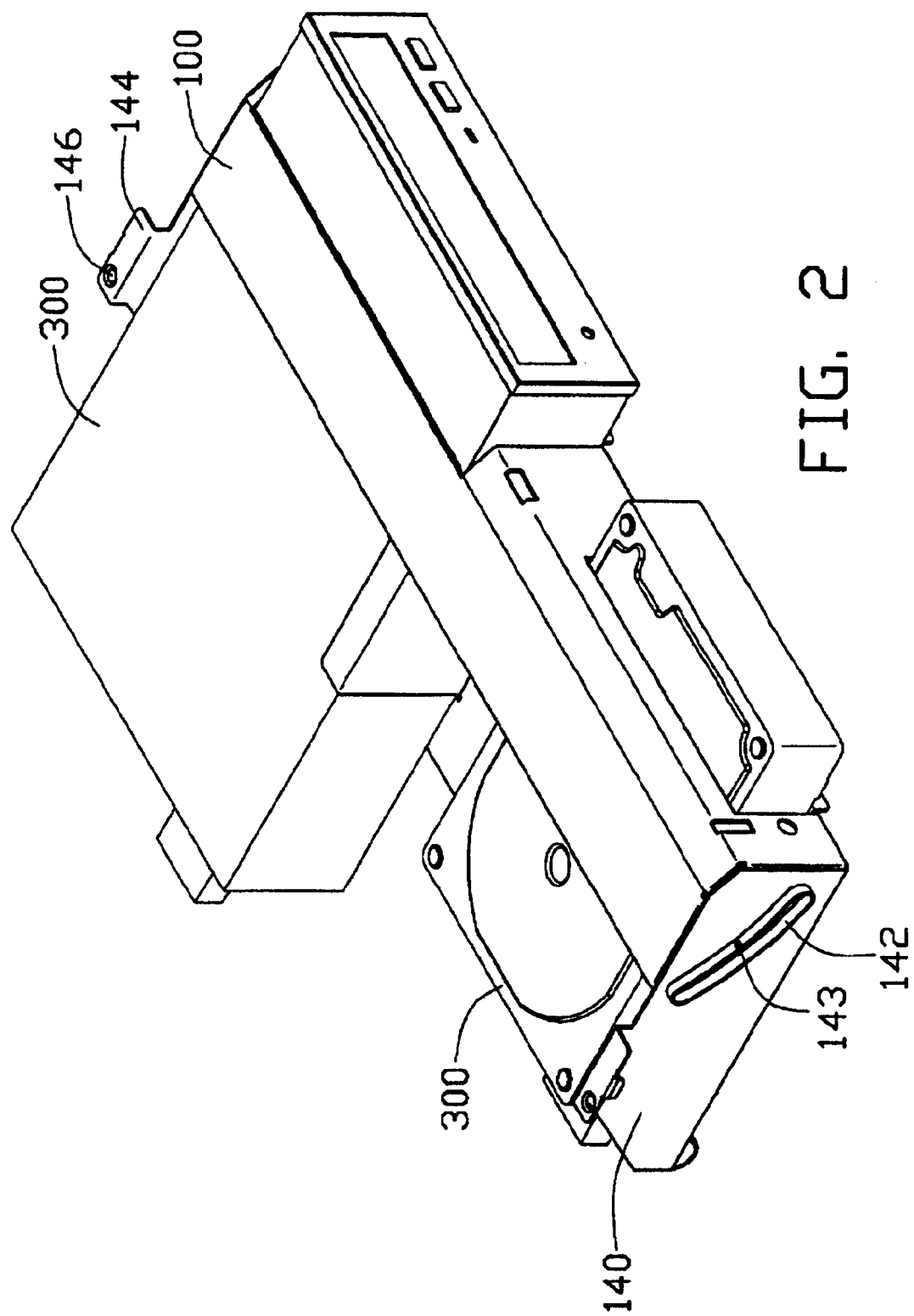
FIG. 2 is an assembled view of a drive bracket of the computer enclosure and the data storage devices of FIG. 1.
Figure 4:
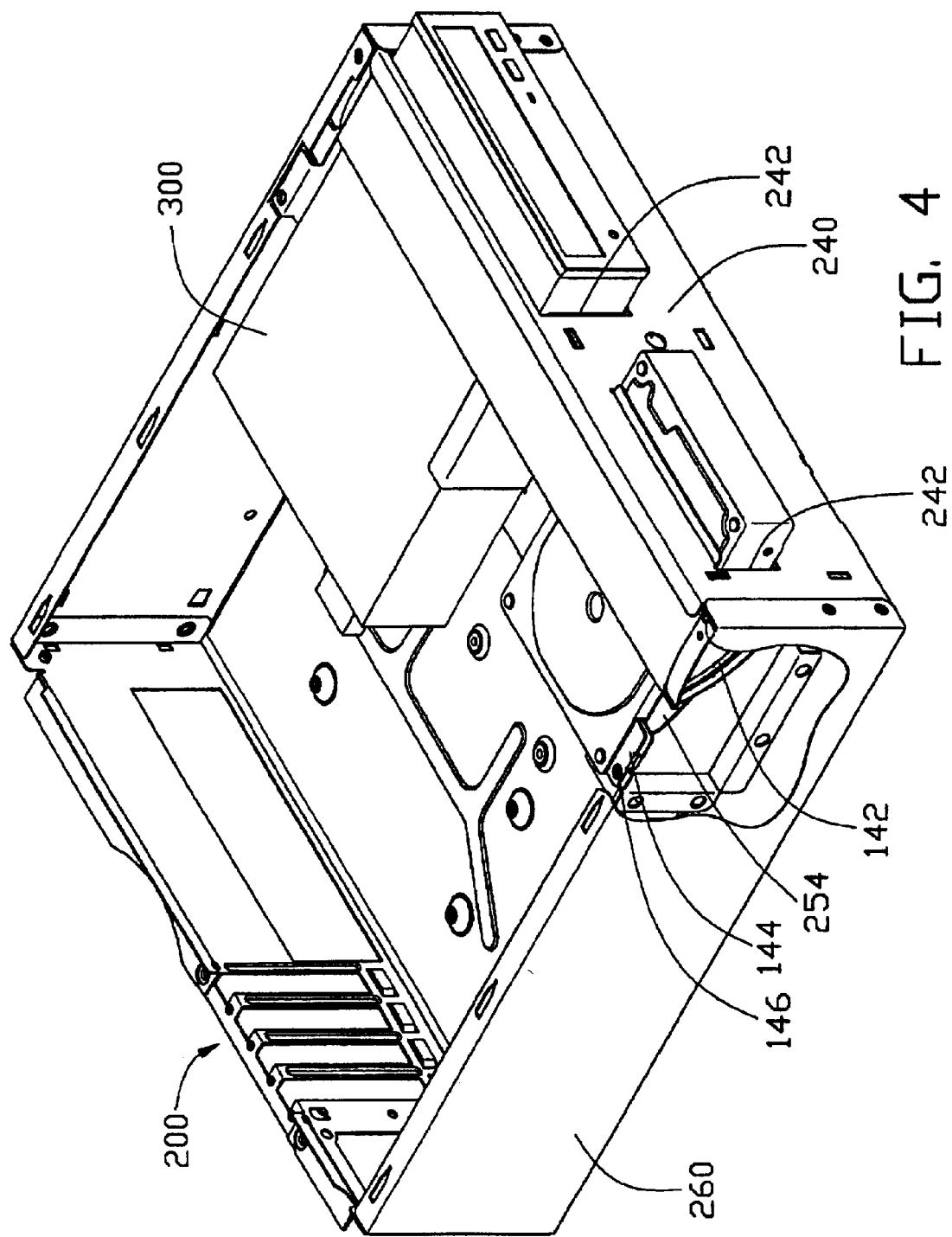
FIG. 4 is a fully assembled and partly cut-away view of FIG. 1, showing the drive bracket in a second position.

Referring to FIGS. 2–4, in assembly, the data storage devices 300 are attached to the drive bracket 100. The data storage devices 300 are extended through the openings 132 to protrude beyond the front plate 130. The combined data storage devices 300 and drive bracket 100 is then inverted, and placed on the cage 200. The protrusions 288 of the cage 200 are received in the cutouts 143 of the drive bracket 100. The drive bracket 100 is thus supported on the front panel 240, and is partly received in the cage 200. In this position, the railways 142 of the drive bracket 100 are defined as being in a first position. The cage 200 is accessible such that a user can connect cables of the data storage devices 300 to a motherboard (not shown) within the cage 200. The combined data storage devices 300 and drive bracket 100 is then rotated in direction A (see FIG. 3). The railways 142 of the drive bracket 100 rotate and slide along the guideways 282 of the cage 200 until the railways 142 abut the supporting walls 280 at frontmost ends of the guideways 282. The combined data storage devices 300 and drive bracket 100 is thus in a horizontal position. The flanges 144 of the drive bracket 100 are supported on the recessed portions 264 of the cage 200. The insertion tabs 148 of the drive bracket 100 are received in the slots 268 of the cage 200. In this position, the railways 142 are defined to be in a second position in which the data storage devices 300 are fully received in the cage 200. The first through apertures 146 of the drive bracket 100 are in alignment with the second through apertures 266 of the cage 200. Screws (not shown) are extended through the first, second and third through apertures 146, 266, 287 to secure the drive bracket 100 to the cage 200. Thus, the data storage devices 300 are fully installed in the cage 200. The data storage devices 300 protrude through the windows 242 beyond the front panel 240 of the cage 200.

In disassembly, said screws are unscrewed from the drive bracket 100 and the cage 200. The insertion tabs 148 are pulled up from the slots 268. The combined data storage devices 300 and drive bracket 100 is rotated in a direction opposite to direction A, with the railways 142 passing through the guiding entrances 284. The protrusions 288 are received in the cutouts 143, and the drive bracket 100 is supported on the front panel 240. In this first position, the user can disconnect the cables of the drive brackets 300 from the motherboard. The data storage devices 300 are then detachable from the drive bracket 100. There is no need to detach the drive bracket 100 from the cage 200.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a cage comprising a front panel and a pair of supporting walls, the front panel defining at least one window, each of the supporting walls defining a guideway; and
   a drive bracket defining at least one receiving space for accommodating at least one data storage device therein, the drive bracket comprising a front plate defining at least one opening corresponding to the at least one window for providing external access to the at least one data storage device, and a pair of side plates each having a railway, the railways being slidable along the guideways whereby the drive bracket is pivotably attached to the cage.

2. The computer enclosure as claimed in claim 1, wherein the cage further comprises a pair of side panels each having a first strip extending inwardly therefrom, and each of the supporting walls has a rim abutting and being secured to a corresponding first strip.

3. The computer enclosure as claimed in claim 2, wherein each of the first strips forms a recessed portion, and each of the side plates of the drive bracket has an outer flange supported on a corresponding recessed portion.

4. The computer enclosure as claimed in claim 3, wherein each of the recessed portions defines a slot, and each of the flanges has an insertion tab received in a corresponding slot.

5. The computer enclosure as claimed in claim 4, wherein each of the flanges defines a first aperture, each of the recessed portions defines a second aperture, each of the rims defines a third aperture, and fasteners are extended through the first, second and third apertures to secure the flanges, recessed portions and rims together.

6. The computer enclosure as claimed in claim 2, wherein each of the rims has a guiding entrance separating the rim into a front part and a rear part.

7. The computer enclosure as claimed in claim 6, wherein the front part is an arcutate such that a lowermost end of the front part is adjacent the guiding entrance.

8. The computer enclosure as claimed in claim 7, wherein each of the railways defines a cutout, and each of the front parts has a protrusion extending upwardly therefrom and being received in a corresponding cutout.

9. The computer enclosure as claimed in claim 2, wherein each of the side panels further comprises a second strip secured to the front panel.

10. The computer enclosure as claimed in claim 2, wherein the supporting walls extend inwardly from opposite sides of the front panel and are spaced from corresponding side panels.

11. The computer enclosure as claimed in claim 2, wherein the supporting walls depend from the first strips, respectively, and each of the supporting walls is spaced from a corresponding side panel.

12. The computer enclosure as claimed in claim 2, wherein the supporting walls are separate member and secured to the side panels.

13. A computer comprising:
    at least one data storage device;
    a cage comprising a front panel, a pair of supporting walls being perpendicular to the front panel and providing a guideway, and a horizontal rim defining a guiding entrance separating the horizontal rim into a front part and a rear part, the front part having a protrusion; and
    a drive bracket accommodating the at least one data storage device therein, the drive bracket comprising a pair of side plates each having a railway, each of the railways defining a cutout, wherein
    the railways are slidable along the guideways between a first position in which the protrusions are received in the cutouts and the at least data storage device is partly received in the cage and a second position in which the at least data storage device is fully received in the cage.

14. The computer as claimed in claim 13, wherein the front part is arcuate and a rearmost end of the front part is lowermost from which the protrusion extends.

15. The computer as claimed in claim 13, wherein the cage comprises a pair of side panels each having a horizontal bent strip below which a corresponding horizontal rim is secured, and each of the side plates of the drive bracket comprises a flange supported on a corresponding horizontal bent strip in the second position.

16. The computer as claimed in claim 15, wherein each of the horizontal bent strips defines a slot, and each of the flanges has an insertion tab inserted into a corresponding slot in the second position.

17. The computer as claimed in claim 13, wherein the guideways span from corresponding guiding entrances to a bottom front portion of the supporting walls, respectively.

18. A computer enclosure comprising:

a cage defining a pair of opposite supporting walls along a front-to-back direction;

a drive bracket defining a pair of side plates corresponding to said supporting walls, respectively;

guiding means formed on one of said supporting walls and said side plates;

railway means formed on the other one of said supporting walls and said side plates;

via railway means moving along the guiding means, the drive bracket being able to steadily and supportably move, from a lower horizontal position, relative to the cage in a first oblique manner along a front/lower to rear/higher direction, wherein said cage and said drive bracket are configured to have relatively large clearance between said rail means and said guiding means when said drive bracket is moved to an upper position relative to the cage, thus results in said drive bracket being able to be rotated relative to the cage and finally extending in a second oblique manner along a front/higher to rear/lower direction and supportably suspended above the cage.

19. The enclosure as claimed in claim 18, wherein said guiding means and said railway means include means for supporting said drive bracket in position in said second oblique manner.

* * * * *